United States Patent
Yoneya

[15] 3,649,894
[45] Mar. 14, 1972

[54] CONTROL CIRCUIT FOR DRIVING AN ALTERNATING CURRENT MOTOR AT A SPEED CORRESPONDING TO THE MAGNITUDE OF A CONTROL SIGNAL AND FOR BRAKING THE MOTOR WHEN THE SIGNAL FALLS BELOW A CERTAIN VALUE

[72] Inventor: Juho Yoneya, Tokyo, Japan
[73] Assignee: Sony Corporation, Tokyo, Japan
[22] Filed: Aug. 14, 1970
[21] Appl. No.: 63,728

[30] Foreign Application Priority Data
Aug. 15, 1969 Japan..............................44/77894

[52] U.S. Cl...............................318/210, 318/225, 318/227, 318/230, 318/373
[51] Int. Cl.........................................................H02p 3/20
[58] Field of Search................................318/209–212, 225, 318/227, 230, 373

[56] References Cited

UNITED STATES PATENTS

| | | | |
|---|---|---|---|
| 3,189,290 | 6/1965 | Welsh et al. | 318/227 X |
| 2,837,708 | 6/1958 | Jones et al. | 318/210 |
| 2,237,070 | 2/1966 | Inaba et al. | 318/227 |
| 3,252,067 | 5/1966 | Derenbecher, Jr. | 318/227 X |

Primary Examiner—Gene Z. Rubinson
Attorney—Lewis H. Eslinger, Alvin Sinderbrand and Curtis, Morris & Safford

[57] ABSTRACT

An alternating current motor having main and auxiliary windings is provided with a control circuit by which circuit flows in the windings produce a rotating magnetic field for driving the motor so long as control signals applied to the circuit are above a predetermined value and the speed of rotation of the motor is made dependent on the magnitude of the control signals. When the control signals fall below the predetermined value, the current flows in the windings are altered by the control circuit to provide a retarding magnetic field, which may rotate in opposition to the rotating magnetic field for normal driving of the motor, whereby to exert a braking action.

10 Claims, 9 Drawing Figures

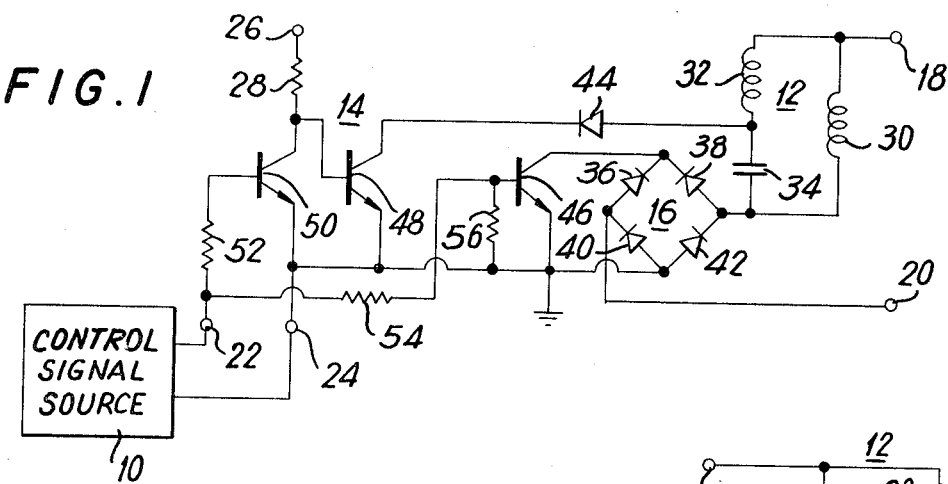
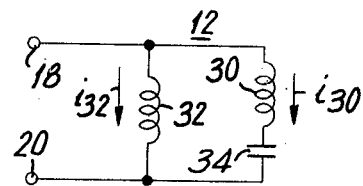
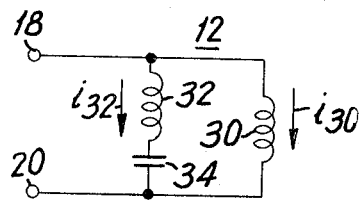
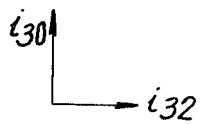
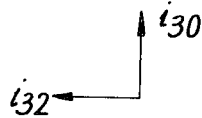
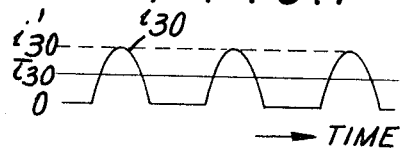
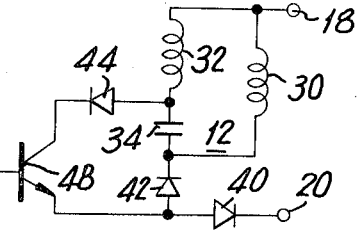
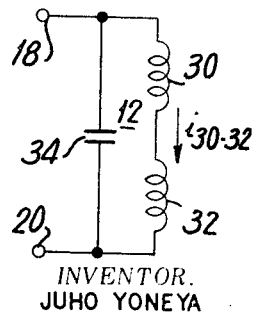
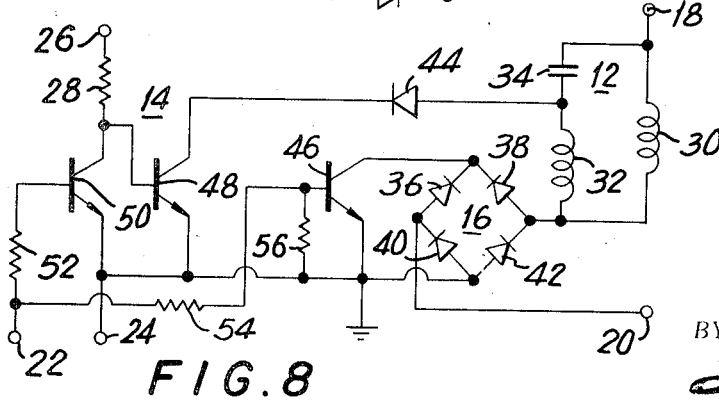
INVENTOR.
JUHO YONEYA

3,649,894

CONTROL CIRCUIT FOR DRIVING AN ALTERNATING CURRENT MOTOR AT A SPEED CORRESPONDING TO THE MAGNITUDE OF A CONTROL SIGNAL AND FOR BRAKING THE MOTOR WHEN THE SIGNAL FALLS BELOW A CERTAIN VALUE

This invention relates to alternating current motor control circuits and more particularly to such circuits which provide both variable control of motor speed and rapid slowing down of the motor when desired.

An inherent advantage of a direct current motor is that once power is removed, armature rotation is braked by a retarding magnetic field. Alternating current motors do not have this braking characteristic, however. When power is removed from an alternating current motor, only friction and the retarding force of the driven load cause the armature to flow down. Since many electric motor applications require a rapid stopping capacity, such armature coasting is often highly undesirable. For example, in magnetic tape recorders, it is important to be able to stop movement of the tape rapidly to ensure accurate location on the tape during both recording and playback. Presently, when alternating current motors are used in such applications, more than 30 seconds are required to slow the tape velocity down from 19 cm./sec. to 4.8 cm./sec.

The present invention provides an accurate means for controlling the speed of alternating current motors. In addition to such control, the invention also solves the previously mentioned slowdown problem. The control means required to effect these two control functions are integrated into a single circuit. While the means controlling motor speed is in operation, the slowdown means is kept inactive by a switching means. When the means controlling speed is cut off, however, the switching means activates the slowdown means thus causing the motor to slowdown and stop. Utilizing such means in a magnetic tape recorder, as previously discussed, the 30 second period required to slow the tape velocity down from 19 cm./sec. to 4.8 cm./sec. can be reduced to 1 second.

In view of the foregoing, an object of the present invention is to provide an alternating current motor control circuit capable of varying motor speed as a control signal is varied.

Another object of the present invention is to provide an alternating current motor control circuit capable of quickly reducing motor speed.

A further objective of the present invention is to provide a switching circuit which will activate a speed reducing means when the control signal is either zero or negative.

Still another object of the present invention is to provide an alternating current motor control circuit which will generate either a reverse rotating magnetic field or a nonrotating magnetic field in the motor when the control signal is either zero or negative.

Still a further object of the present invention is to provide an alternating current motor control circuit with a full wave rectifying circuit located between the motor and the control means.

These and further objects, features and advantages of the present invention will appear from a reading of the following detailed description of several embodiments of the invention to be read in conjunction with the accompanying drawings in which similar components in the several figures are identified by the same reference numerals.

In the drawing:

FIG. 1 is a circuit diagram of one embodiment of the present invention;

FIG. 2 is an equivalent circuit diagram of the circuit illustrated in FIG. 1 during normal operation of the motor and showing the currents flowing in the motor windings when a positive half-wave voltage is applied to one of the terminals;

FIG. 3 is a phase diagram of the two currents shown in FIG. 2;

FIG. 4 is an equivalent circuit diagram of the circuit illustrated in FIG. 1 during motor braking;

FIG. 5 is an equivalent circuit diagram of the circuit in FIG. 4 showing the currents in the windings when a positive half-wave voltage is applied to one of the terminals during motor braking;

FIG. 6 is a phase diagram of the two currents shown in FIG. 5;

FIG. 7 is a waveform diagram of the current flowing through one of the motor windings during motor braking;

FIG. 8 is a circuit diagram of another embodiment of the present invention; and

FIG. 9 is an equivalent circuit diagram of the circuit illustrated in FIG. 8 showing the current flow when a positive half-wave voltage is applied to one of the terminals during motor braking.

Referring to FIG. 1 in detail, it will be seen that, in the embodiment of the invention there shown, a main winding 30 and a secondary or auxiliary winding 32 of an alternating current motor 12 are connected in parallel. A phase lead condenser 34 is connected in series with secondary winding 32. The motor 12 is connected to a full wave rectifier 16 consisting of four diodes 36, 38, 40 and 42. The rectifier 16 keeps the alternating current, supplied at terminals 18 and 20, positive when entering the collector of a main control transistor 46. When transistor 46 is conducting and a positive voltage is applied at terminal 18, current flows through both windings 30 and 32 of motor 12 when through diode 38 into the collector of transistor 46. Exiting from the emitter of transistor 46 the current then flows through diode 40 and out terminal 20. Similarly, when a positive voltage is applied to terminal 20, current flows through diode 36, transistor 46, diode 42 and windings 30 and 32 of motor 12 to terminal 18.

A DC control signal, for example, from a source 10 which may be a servo signal generating circuit, may be suitably applied to terminals 22 and 24. Both of these terminals are connected to the base of transistor 46 through resistors 54 and 56, respectively, and terminal 24 if further connected to the emitter of transistor 46 and to ground. The current through the base of transistor 46, therefore, varies in accordance with the control signal. It is this variation which causes the impedance of transistor 46 to change thus controlling the current flow in the motor windings and, therefore, the motor speed.

Terminals 22 and 24 are also connected to a switching circuit 14 comprising two serially connected transistors 48 and 50. Terminal 22 is connected to the base of transistor 50 through a resistor 52 and terminal 24 is connected directly to the emitters of both transistors 48 and 50 as well as to the emitter of transistor 46. A suitable direct current is applied to a terminal 26 which is connected through a resistor 28 to a point common to the base of transistor 48 and the collector of transistor 50. The collector of transistor 48 is connected to a point between motor winding 32 and condensor 34 by way of a diode 44 which permits current flow only toward the collector of transistor 48.

Transistor 50 conducts whenever a positive control signal is applied to terminals 22 and 24. While transistor 50 is conducting, no current flows through the base of transistor 48. Therefore, transistor 48 does not conduct. However, when the control signal to terminals 22 and 24 either drops to zero or becomes negative, current flow through transistor 50 is cut off and current begins flowing through the base of transistor 48. Thus, transistor 48 begins conducting whenever the main control transistor 46 is cut off. When transistor 48 is conducting and a positive voltage is applied at terminal 18, current flows through both windings 30 and 32 of motor 12 and through diode 44 to the collector of transistor 48. At this time, however, condensor 34 is in series with winding 30. Exiting from the emitter of transistor 48, current passes through diode 40 to terminal 20. When a positive voltage is applied at terminal 20, however, current flow is blocked by both diode 40 and the inactive transistor 46 and therefore no current passes through motor 12.

The equivalent circuit of motor 12, when transistor 46 is conducting and terminal 18 is positive, is shown in FIG. 2. The two currents shown in FIGS. 2, $i_{30}$ and $i_{32}$, flow through windings 30 and 32 respectively. FIG. 3 shows the phase relationship between these two currents. Current $i_{32}$ leads $i_{30}$ by 90° because of the condensor 34 located in series with winding 32. This is the normal operating condition of motor 12.

Transistor 46, however, is cut off when either no voltage or a negative voltage is applied to terminals 22 and 24. Concurrently, transistor 50 is also in an off condition. Transistor 48, however, conducts while the other two transistors are off. The operative components of the circuit during this condition are shown in FIG. 4. Diode 40 in FIG. 4 permits only half wave flow through the circuit. The equivalent motor circuit while transistor 48 is conducting is shown in FIG. 5. Here again, the currents flowing through through windings 30 and 32 are designated $i_{30}$ and $i_{32}$ respectively. The phase relationship between these currents is shown in FIG. 6. This time current through winding 30 leads the current through winding 32 by 90° because condenser 34 is not in series with winding 30. The effect of this reversal in phase is to also cause a reversal in the rotating magnetic field. This newly created field, therefore, acts to rotate the motor in the opposite direction to its normal operating rotation thus slowing and eventually stopping motor rotation.

The current waveform flowing through each winding, 30 and 32, of motor 12 is similar but shifted in phase. The waveform through winding 30 is shown in FIG. 7 to be half-rectified waveform, but it may be though of as an alternating current having a peak value of $i'_{30}$ and added to a direct bias current $\bar{i}_{30}$. Braking power is proportional to the bias current $\bar{i}_{30}$. This bias current may be derived as follows:

$$\bar{i}_{30} = \int_0^{2\pi} f(\omega) d\omega = \frac{1}{2\pi} \int_0^{\pi} i'_{30} \sin \theta d\theta = \frac{i'_{30}}{\pi}$$

Similarly, the bias current through winding 32 is $\bar{i}_{32}$. The current flow through the motor, while transistor 48 is conducting, may be thought of as consisting of two components; the first component being a bias current which provides braking and the second an alternating current which provides a rotating magnetic field in the opposite direction from normal operation to also effect braking.

Another embodiment of the invention is shown in FIG. 8. In this embodiment, the locations of winding 32 and condensor 34 in the circuit shown in FIG. 1 are exchanged with each other. Performance during normal operation while transistor 46 is conducting is unchanged by this modification. However, when transistor 48 begins conducting and a positive voltage is applied to terminal 18, the equivalent motor circuit, shown in FIG. 9, places the two windings 30 and 32 in series. In this case, a nonrotating magnetic field is created. The current $i_{30\text{-}32}$ through the windings however, still contains a bias component as previously discussed. The embodiment of FIG. 8, therefore, still provides a braking function when a zero or negative control voltage is applied to terminals 22 and 24.

While two embodiments of the invention have been illustrated and described in detail, it is to be understood that these are merely illustrative. It will be apparent to those skilled in the art that many modifications and variations of the invention may be effected without departing from the scope of the novel concepts of the invention as set forth in the appended claims.

What is claimed is:

1. A control circuit for an alternating current motor comprising winding means to establish magnetic fields influencing the rotation of the motor in response to current flows in said winding means, a source of variable control signals, first control means operative when the magnitude of said control signals exceeds a predetermined value to provide current flows in said winding means which establish a rotating magnetic field for driving said motor in one direction at a speed in dependence on said magnitude of the control signals, and second control means operative when said magnitude of the control signals falls below said predetermined value to provide current flows in said winding means which establish a retarding magnetic field for braking the rotation of the motor in said one direction, and in which said winding means includes two windings, said first control means when operative connects said two windings in parallel and with a lead capacitor in series with one of said windings, and said second control when operative connects said two windings in series with each other and in parallel with said lead capacitor.

2. A control circuit for an alternating current motor comprising winding means to establish magnetic fields influencing the rotation of the motor in response to current flows in said winding means, a source of variable control signals, first control means operative when the magnitude of said control signals exceeds a predetermined value to provide current flows in said winding means which establish a rotating magnetic field for driving said motor in one direction at a speed in dependence on said magnitude of the control signals, and second control means operative when said magnitude of the control signals falls below said predetermined value to provide current flows in said winding means which establish a retarding magnetic field for braking the rotation of the motor in said one direction, and in which said first control means includes a first transistor having said control signals applied thereto and being made conductive by said magnitude of the control signals exceeding said predetermined value with the impedance of the conductive first transistor varying in dependence on said magnitude of said control signals.

3. A control circuit for an alternating current motor according to claim 2, in which said second control means includes a second transistor which, when conductive, provides said current flows in said winding means establishing said retarding magnetic field, and switch means responsive to said control signals to maintain said second transistor nonconductive so long as said magnitude of the control signals exceeds said predetermined value and to render said second transistor conductive when said magnitude of the control signals falls below said predetermined value.

4. A control circuit for an alternating current motor according to claim 3, in which said switch means includes a third transistor rendered conductive by said control signals only when the magnitude of the latter exceeds said predetermined value.

5. A control circuit for an alternating current motor comprising winding means to establish magnetic fields influencing the rotation of the motor in response to current flows in said winding means, a source of variable control signals, first control means operative when the magnitude of said control signals exceeds a predetermined value to provide currents flows in said winding means which establish a rotating magnetic field for driving said motor in one direction at a speed in dependence on said magnitude of the control signals, and second control means operative when said magnitude of the control signals falls below said predetermined value to provide current flows in said winding means which establish a retarding magnetic field for braking the rotation of the motor in said one direction, and in which said windings means includes two windings, said first control means includes a variable impedance element connected with said source of control signals to have its impedance varied inversely in accordance with said magnitude of the control signals, terminals receive an alternating current voltage for producing said current flows, circuit means connect said windings in parallel with each other to one of said terminals with a lead capacitor in series with one of said windings and with said variable impedance element interposed between said parallel connecting windings and the other of said terminals, and said second control means includes an element conductive only when said magnitude of the control signals falls below said predetermined value and connected between said other terminal and a junction in said circuit means between said lead capacitor and said one winding.

6. A control circuit for an alternating current motor according to claim 5, in which said variable impedance element is constituted by a first transistor having said control signals applied thereto so as to be conductive only when said magnitude of the control signals exceeds said predetermined value with the impedance of the conductive first transistor varying inversely with said magnitude, and full-wave rectifying means is connected with said circuit means and said first transistor to provide unidirectional current flow through the latter with alternating current flow through said windings.

7. A control circuit for an alternating current motor according to claim 6, in which said element of the second control means is constituted by a second transistor, said second control means further includes switch means responsive to said control signals to render said second transistor conductive only when said magnitude of the control signals falls below said predetermined value and diode means connected between said junction and said second transistor, and said second transistor is connected with said other terminal by way of said rectifying means.

8. A control circuit for an alternating current motor according to claim 7, in which said switch means includes a third transistor rendered conductive by said control signals only when the magnitude of the latter exceeds said predetermined value.

9. A control circuit for an alternating current motor according to claim 8, in which said one winding is interposed between said one terminal and said junction so that said lead capacitor is in series with said one winding when said first transistor is conducting and in series with the other of said windings when said second transistor is conducting.

10. A control circuit for an alternating current motor according to claim 8, in which said lead capacitor is interposed between said one terminal and said junction so that said lead capacitor is in series with said one winding when said first transistor is conducting and said windings are in series with each other and in parallel with said capacitor when said second transistor is conducting.

* * * * *